US008568074B2

(12) United States Patent
Wrigley

(10) Patent No.: US 8,568,074 B2
(45) Date of Patent: Oct. 29, 2013

(54) TWO-PART DEVICE

(75) Inventor: Gordon Wrigley, Tyne and Wear (GB)

(73) Assignee: Draeger Safety UK Limited, Blyth, Northumberland (GB)

( * ) Notice: Subject to any disclaimer, the term of this patent is extended or adjusted under 35 U.S.C. 154(b) by 457 days.

(21) Appl. No.: 12/788,711

(22) Filed: May 27, 2010

(65) Prior Publication Data

US 2011/0064537 A1 Mar. 17, 2011

(30) Foreign Application Priority Data

Sep. 15, 2009 (GB) .................................. 0916092.0

(51) Int. Cl.
*F16B 39/06* (2006.01)

(52) U.S. Cl.
USPC ...................................... 411/321; 128/205.24

(58) Field of Classification Search
USPC ......... 411/321, 210, 216, 217, 221, 229, 322, 411/925; 220/254.7, 259.3, 328; 285/91, 285/305, 92; 128/205.24, 204.29
See application file for complete search history.

(56) References Cited

U.S. PATENT DOCUMENTS

| | | | | |
|---|---|---|---|---|
| 4,540,098 | A * | 9/1985 | Luker | 215/216 |
| 6,010,289 | A * | 1/2000 | DiStasio et al. | 411/174 |
| 6,688,651 | B2 * | 2/2004 | Min-cheol | 285/92 |
| 7,530,605 | B2 * | 5/2009 | Rigollet et al. | 285/305 |
| 7,571,937 | B2 * | 8/2009 | Patel | 285/92 |
| 2006/0090754 | A1 | 5/2006 | Mittelstadt et al. | 128/201.17 |

FOREIGN PATENT DOCUMENTS

| | | | |
|---|---|---|---|
| CN | 2468939 | Y | 1/2002 |
| GB | 2 001 127 | A | 1/1979 |
| GB | 10 2007 044897 | B3 | 11/2008 |
| WO | 99/07633 | A1 | 2/1999 |

* cited by examiner

*Primary Examiner* — Gary Estremsky
(74) *Attorney, Agent, or Firm* — DLA Piper LLP (US)

(57) ABSTRACT

A two-part device arranged for threaded assembly comprising a first part having a first threaded section provided on an external generally cylindrical surface and a second part having a second threaded section arranged for threaded engagement with the first threaded section and provided on an internal generally cylindrical surface. A locking opening is provided on the first or second part and a corresponding locking protrusion is provided on the other of the first or second part. When the first and second parts are threaded together by means of the first and second threaded sections, the locking opening and locking protrusion are drawn closer together and upon reaching a threshold the locking protrusion engages with the locking opening. This inhibits the first and second parts from being threadedly disengaged.

17 Claims, 8 Drawing Sheets

TWO-PART DEVICE

This application is a utility application which claims the priority of United Kingdom Patent Application No. GB 0916092.0, filed Sep. 15, 2009 incorporated herein by reference in its entirety.

BACKGROUND OF THE INVENTION

The present invention relates to a two-part device arranged for threaded assembly, in particular, a two-part device arranged such that when first and second parts are threaded together they are inhibited from being threadedly disengaged.

Many products and devices require the threaded assembly of two separate components. In some cases it is desirable, or even essential, to prevent the two components from becoming detached. There are a number of known ways of the components together. Examples include adhesives, or a fixing element such as a screw. Whilst these fixing means are satisfactory for some applications, they all require an auxiliary means of fixing and an additional manufacturing step.

It is therefore desirable to provide a two-part device that can be threadedly assembled, such that once the parts have been assembled, disassembly is inhibited without requiring an auxiliary fixing means.

SUMMARY OF THE INVENTION

According to a first aspect of the present invention there is provided a two-part device arranged for threaded assembly, comprising: a first part having a first threaded section provided on an external generally cylindrical surface; a second part having a second threaded section arranged for threaded engagement with the first threaded section and provided on an internal generally cylindrical surface; and a locking opening (otherwise known as a locking hole) provided on the first or second part and a corresponding locking protrusion provided on the other of the first or second part; wherein when the first and second parts are threaded together by means of the first and second threaded sections, the locking opening and locking protrusion are drawn closer together and upon reaching a threshold the locking protrusion engages with the locking opening, thereby inhibiting the first and second parts from being threadedly disengaged.

In a preferred arrangement there are a plurality of locking openings, preferably four locking openings. Further, it is preferable that there are a plurality of locking protrusions, preferably four locking protrusions.

Preferably the number of locking openings is the same as the number of locking protrusions.

The or each locking projection and the or each opening may extend in the general axial direction of the cylindrical surfaces of the first and second threaded sections. Further, the first threaded section may be provided on an external generally cylindrical surface of a cylindrical portion and the or each locking projection may be located on an annular end face of the cylindrical portion. The second part may comprise a base portion located within the internal generally cylindrical surface, the base portion having an internal surface that is in a plane substantially perpendicular to the axis of the cylindrical surface.

The second part may comprise a base located within the generally cylindrical surface, the base having an upper surface in a plane substantially perpendicular to the axis of the cylindrical surfaces and wherein the or each locking opening is provided in the base. The base may be resiliently deformable. The base may have a central opening.

The or each locking protrusion may be resiliently deformable. The first part and or the second part may be made from a plastics material.

According to a further aspect of the present invention there is provided an article comprising the two-part device according to any statement herein, wherein the first and second parts are threadedly engaged by means of the first and second threaded sections and the locking protrusion is located in the locking opening, thereby inhibiting the first and second parts from being threadedly disengaged.

According to yet a further aspect of the present invention there is provided a holder for a lung demand valve for breathing apparatus comprising the two-part device according to any statement herein, wherein the first and second parts are threadedly engaged by means of the first and second threaded sections and the locking protrusion is located in the locking opening, thereby inhibiting the first and second parts from being threadedly disengaged.

Preferably the second part comprises attachment portions for attaching the holder to a harness for breathing apparatus and the first part comprises a holding portion that allow a lung demand valve to be attached to the holder. The holding portion may comprise an internal thread formed in accordance with either EN 148-1 (Rd40×1/7) and/or EN 148-3 (M45×3) and/or a circumferential locking corresponding to a connector of a lung demand valve formed in accordance with DIN 58600 (ESA) and/or locking tabs arranged to engage a circumferential groove provided on a lung demand valve.

In a preferred embodiment the first and second threaded sections are formed in accordance with either EN 148-1 (Rd40×1/7) or EN 148-3 (M45×3).

The present invention also relates to a harness for breathing apparatus comprising a holder for a lung demand valve according to any statement herein.

According to another aspect of the present invention there is provided a method of assembling a two-part device comprising a first part having a first threaded section, a second part having a second threaded section arranged for threaded engagement with the first threaded section, and a locking opening provided on the first or second part and a corresponding locking protrusion provided on the other of the first or second part, the method comprising: threading together the first and second parts by means of the first and second threaded sections so that the first and second parts are drawn closer together and a threshold is reached upon which the locking protrusion engages with the locking opening, thereby inhibiting the first and second parts from being threadedly disengaged.

The invention may comprise any combination of the features and/or limitations referred to herein, except combinations of such features as are mutually exclusive.

BRIEF DESCRIPTION OF THE DRAWINGS

Embodiments of the present invention will now be described, by way of example only, with reference to the accompanying drawings, in which.

DESCRIPTION OF EMBODIMENTS OF THE INVENTION

Figure 1:
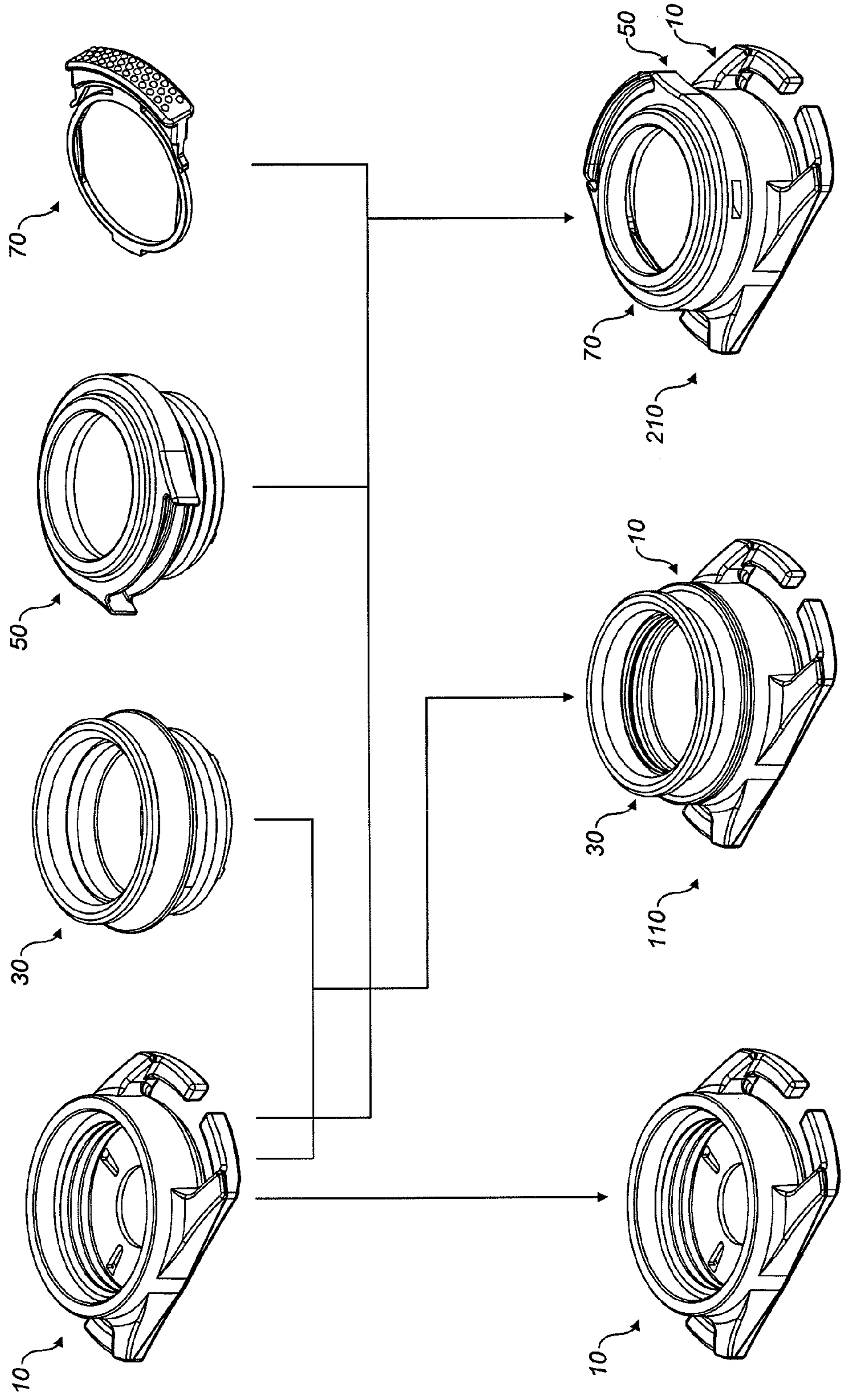
FIG. 1 schematically shows a first embodiment of the present invention in the form of three lung demand valve (LDV) holders and their constituent parts.

FIG. 1 shows a modular system comprising four parts 10, 30, 50, 70 that can be configured to make three different types of lung demand valve (LDV) holder 10, 110, 210. A lung demand valve (LDV) holder is a device used on a harness for breathing apparatus to temporarily secure an LDV when it is not being used. The first type holder 10 is for temporarily retaining an LDV having a connector formed in accordance with EN 148-3 (M45-3) which is an external threaded connection. The second type holder 110 is for temporarily retaining an LDV having a connector formed in accordance with either EN 148-1 (Rd40×1/7) which is an external threaded connection, or DIN 58600 (ESA), which is a plug-in (PI) type connector. The third type holder 210 is for temporarily retaining an LDV having a proprietary plug-in (PI) type connector.

The first type holder 10 (otherwise known as the M45 holder) is made from a universal part 10 only. The second type holder 110 (otherwise known as the Rd40/ESA holder) is made from the universal part 10 and the Rd40/ESA adapter 30. The third type holder 210 (otherwise known as the PI holder) is made from the universal part 10, the PI adapter 50 and the PI retaining spring 70.

Figure 2:
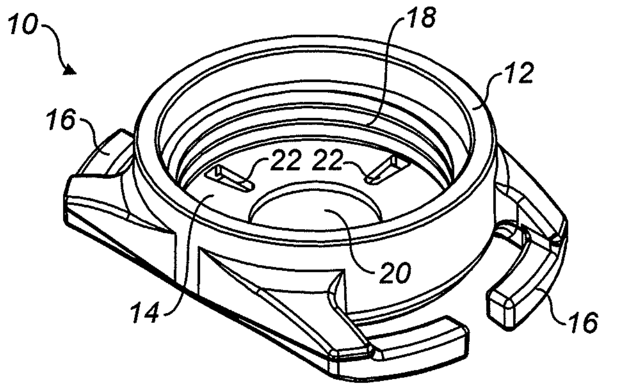
FIG. 2 schematically shows a perspective view of the universal base part/M45 holder of FIG. 1.
Figure 3:
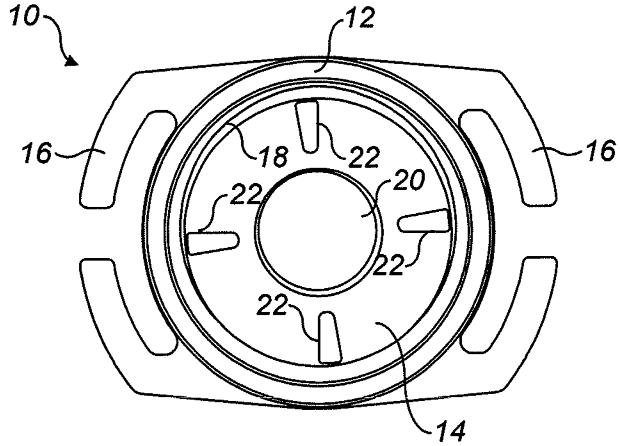
FIG. 3 schematically shows the universal base part/M45 holder of FIG. 2 in plan view.

FIGS. 2 and 3 show the universal part 10 that is common to all three of the holders 10, 110, 210. The universal part 10 comprises a generally cylindrical portion 12, a flat base 14 and two strap-connecting portions 16 that allow the base part 10 to be attached to a shoulder strap (not shown) of a harness for breathing apparatus. The cylindrical portion 12 has an internal M45 thread 18 which allows an LDV having an M45 thread to be screwed into it. The flat base 14 is substantially perpendicular to the axis of the cylindrical portion 12 and has a central opening 20, that is concentric with the cylindrical portion 12 and four locking apertures 22 that are circumferentially and equally spaced around the base 14.

In this embodiment the locking apertures 22 are through-holes in the base 14. The function of the locking aperture is that the locking projection (or projections) can mechanically engage with the locking aperture (or apertures). However, as will be readily apparent to one skilled in the art the locking aperture(s) 22 may be openings, recesses or blind holes.

Figure 4:
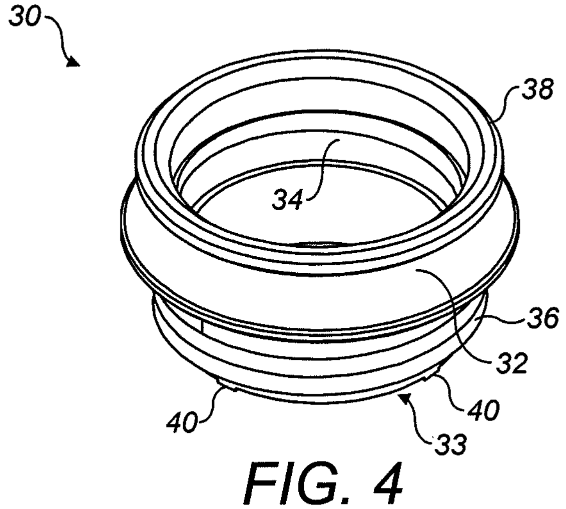
FIG. 4 schematically shows a perspective view of the Rd40/ESA adapter of FIG. 1.

FIG. 4 shows the Rd40/ESA adapter 30 that is part of the second type holder 110. The adapter 30 comprises a generally cylindrical body 32 having an internal Rd40 thread 34 towards the top and an external M45 thread 36 towards the bottom. The external M45 thread 36 allows the adapter 30 to be screwed into the internal M45 thread 18 of the universal part 10. The internal Rd40 thread 34 allows an LDV having an Rd40 thread to be screwed into it. The upper edge of the cylindrical body 32 comprises a circumferential locking lip 38 which allows an LDV having an ESA connector to be push-fitted onto the adapter part 30 with the ESA connector gripping the locking lip 38. The lower edge 33 of the cylindrical body 32 comprises four locking protrusions 40 that are circumferentially and equally spaced around the lower edge 33. The locking protrusions 40 correspond to the locking apertures 22 of the universal part 10.

Figure 5:
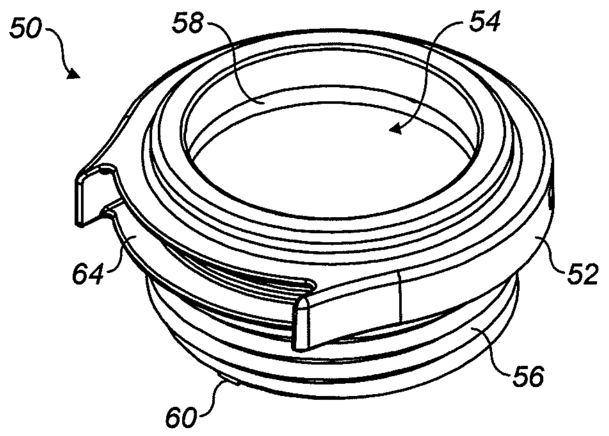
FIG. 5 schematically shows a perspective view of the plug-in adapter of FIG. 1.
Figure 6:
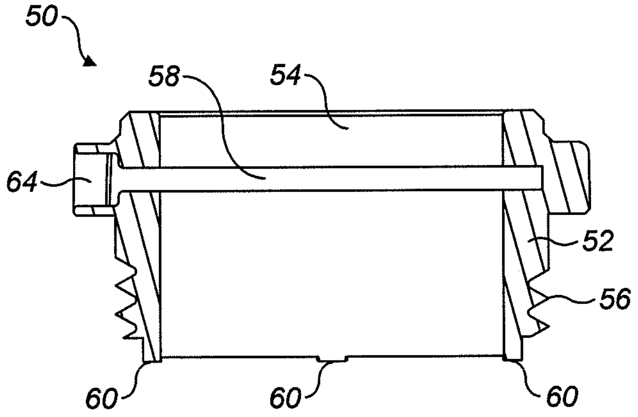
FIG. 6 schematically shows a cross-sectional view of the plug-in adapter of FIG. 5.

FIGS. 5 and 6 show the plug-in (PI) adapter 50 that is part of the third type holder 210. The PI adapter 50 comprises a generally cylindrical body 52 having an axially extending opening 54, which has an inner diameter slightly larger than the outer diameter of a PI connector of an LDV, and an external M45 thread 56 towards the bottom of the body 52. The external M45 thread 56 allows the adapter 50 to be screwed into the internal M45 thread 18 of the universal part 10. The opening 54 has a circumferential groove 58 on its inner surface towards the top, and the body 52 comprises a slot 64 that leads from outside the body 52 to the circumferential groove 58. The plug-in (PI) retaining spring 70 can be inserted through the slot 64 so that it is located within the circumferential groove 58. The lower edge of the cylindrical body 52 comprises four locking protrusions 60 that are circumferentially and equally spaced around the lower edge. The locking protrusions 60 correspond to the locking apertures 22 of the universal part 10.

Figure 7:
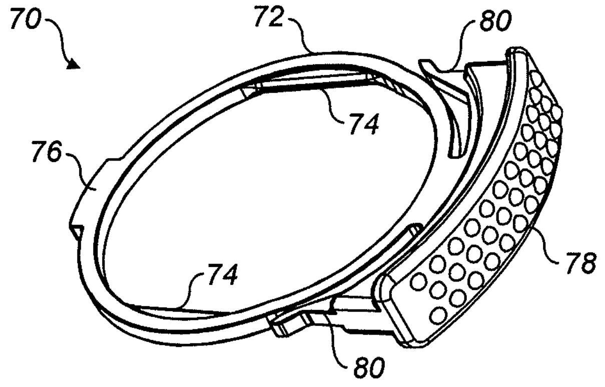
FIG. 7 schematically shows a perspective view of the plug-in spring of FIG. 1.

FIG. 7 shows the plug-in (PI) adapter retaining spring 70 that is part of the third type holder 210. The retaining spring 70 comprises a substantially annular resiliently deformable ring 72 having two inwardly facing retaining tabs 74. The retaining spring 70 also includes an abutment portion 76, a button 78 and two claws 80.

Referring back to FIGS. 1 and 2, the first type (M45) LDV holder 10 is made up from the universal part 10 only. In use, the first type holder 10 can be attached to a shoulder strap of a harness for breathing apparatus by using the strap-connecting portions 16. When an M45 LDV (having an external M45 thread) is not being used it can be temporarily held by the holder by screwing it into the internal M45 thread 18 of the M45 holder 10.

Figure 8:
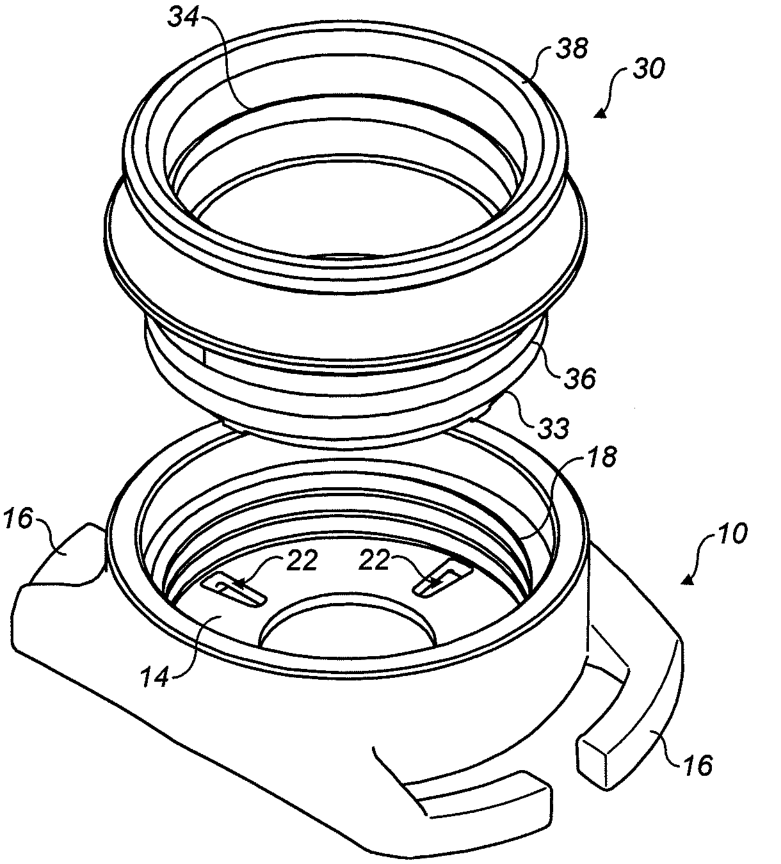
FIG. 8 schematically shows the universal part and the Rd40/ESA adapter.
Figure 9:
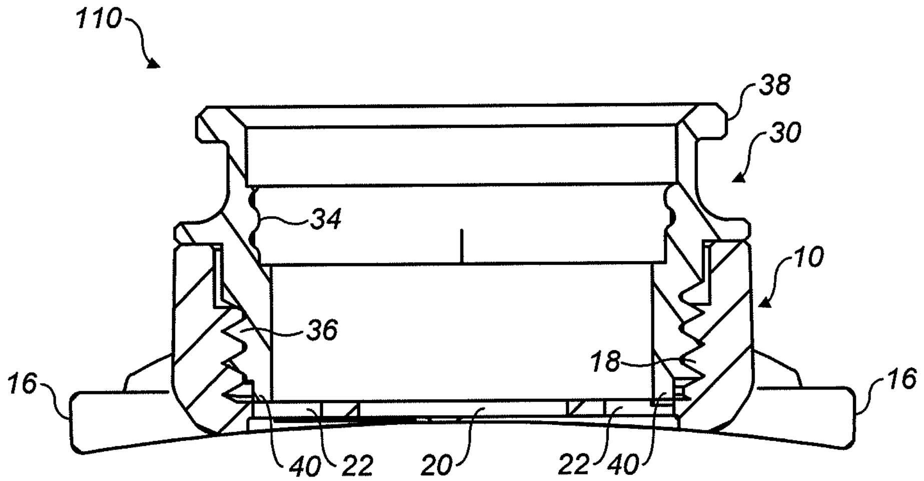
FIG. 9 schematically shows a cross-sectional view of the assembly of the universal part and the Rd40/ESA adapter.
Figure 10:
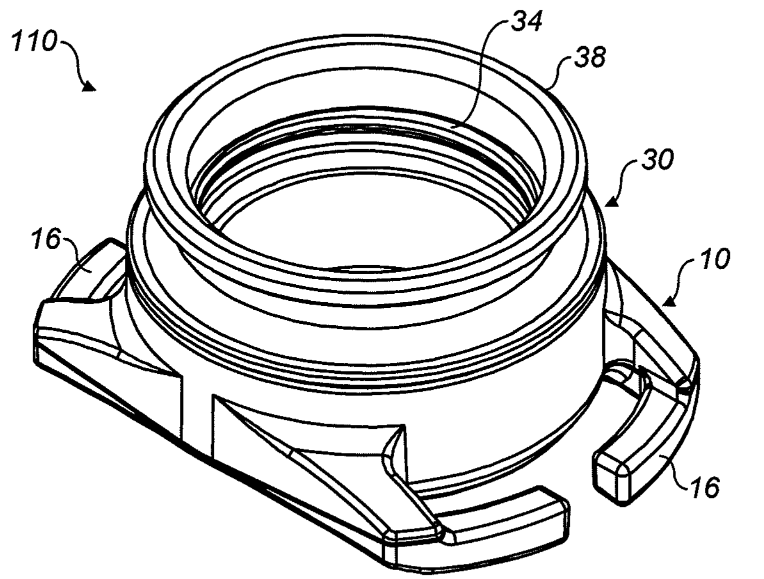
FIG. 10 schematically shows a perspective view of the assembly of FIG. 9.

Referring now to FIGS. 8-10, in order to make the second type (Rd40/ESA) LDV holder 110, the universal part 10 and the Rd40/ESA adapter 30 are threadedly engaged using the external thread 36 of the adapter 30 and the internal thread 18 of the universal base 10. As the two parts 10, 30 are screwed together they are drawn closer together and the lower edge 33 of the adapter 30 moves closer to the base part 14 of the universal part 10. After a threshold number of turns the locking protrusions 40 of the adapter 30 come into contact with the base 14 of the universal part 10. As the parts 10, 30 are screwed further together the protrusions 40 press against the base 14 and cause the base 14 to be resiliently deformed outwards. Upon further rotation of the adapter 30 relative to the universal part 10, the locking protrusions 40 align with the locking openings 22 and the base 14 of the universal part 10 returns to its original shape, causing the locking protrusions 40 to be located within the locking openings 22. Since the locking protrusions 40 are located in the locking openings 22, the adapter 30 can no longer be rotated with respect to the universal part 10. This prevents the two parts 10, 30 from being screwed together further, but importantly, prevents them from being unscrewed and disassembled.

In use, the second type holder 110 can be attached to a shoulder strap of a harness for breathing apparatus by using the strap-connecting portions 16 of the universal part. When an Rd40 LDV (having an external Rd40 thread) is not being used, it can be temporarily held by the holder by screwing it into the Rd40 internal thread 34 of the Rd40/ESA holder 110. When an ESA LDV (having an ESA push-fit connector) is not being used, it can be temporarily held by the holder by engaging the ESA connector of the LDV with the circumferential locking lip 38 of the Rd40/ESA holder 110.

Figure 11:
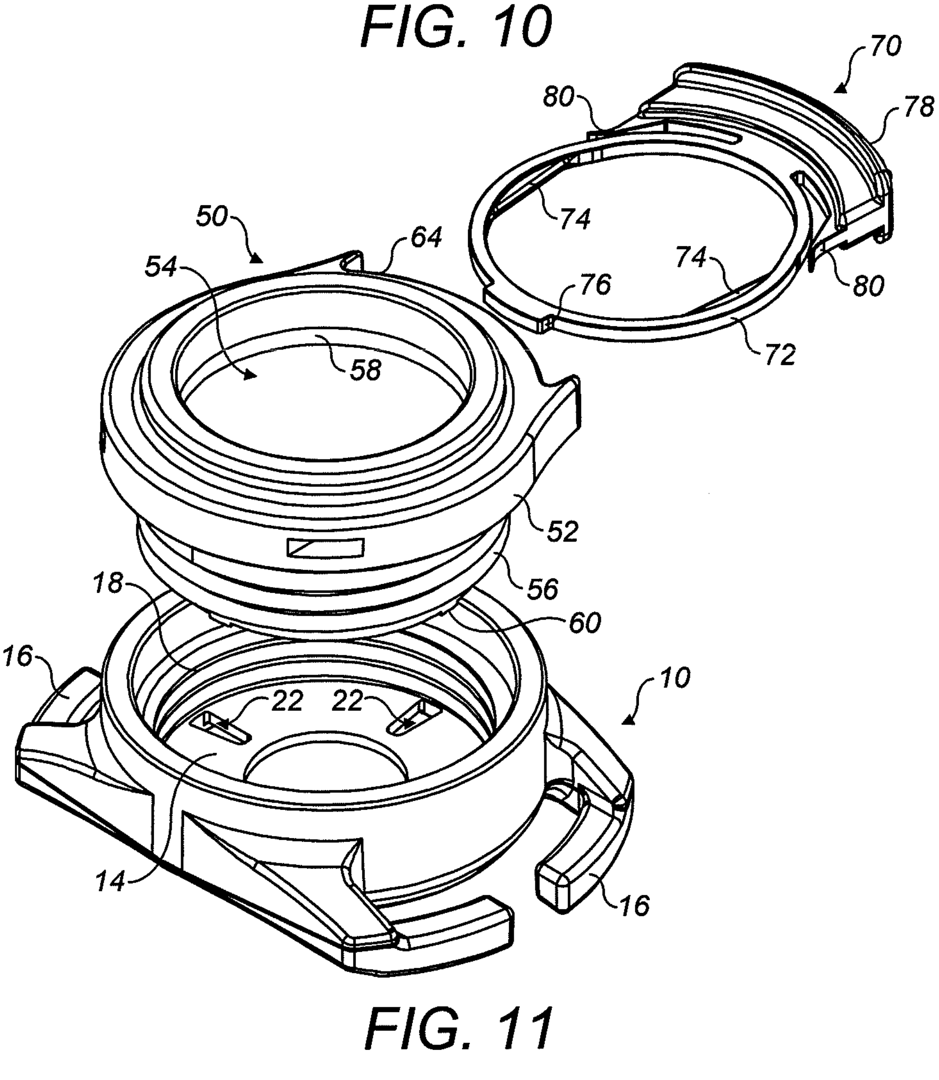
FIG. 11 schematically shows the universal part, the plug-in adapter and the plug-in spring.
Figure 12:
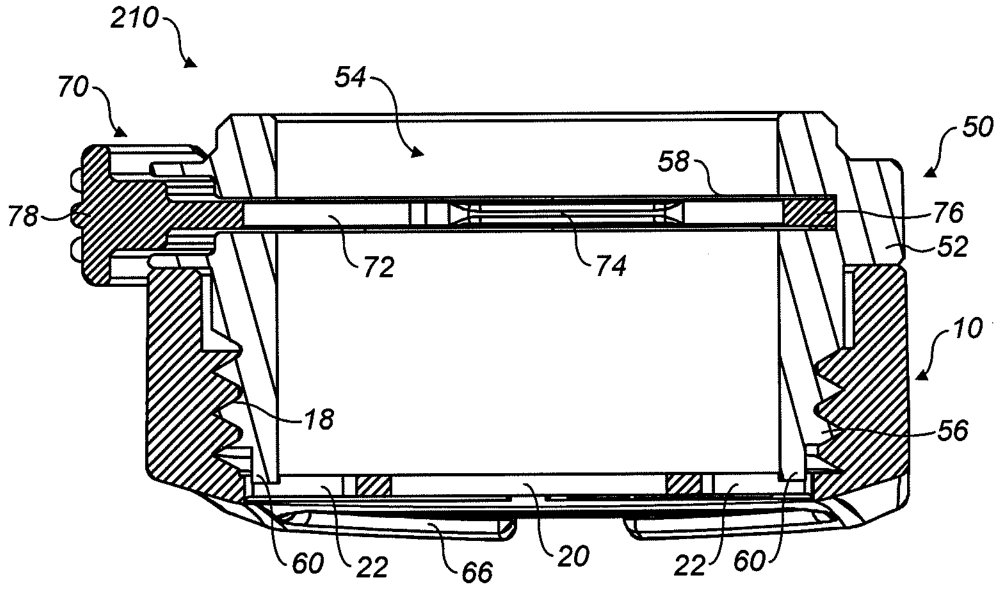
FIG. 12 schematically shows a cross-sectional view of the assembly of the universal part, plug-in adapter and the plug-in spring.
Figure 13:
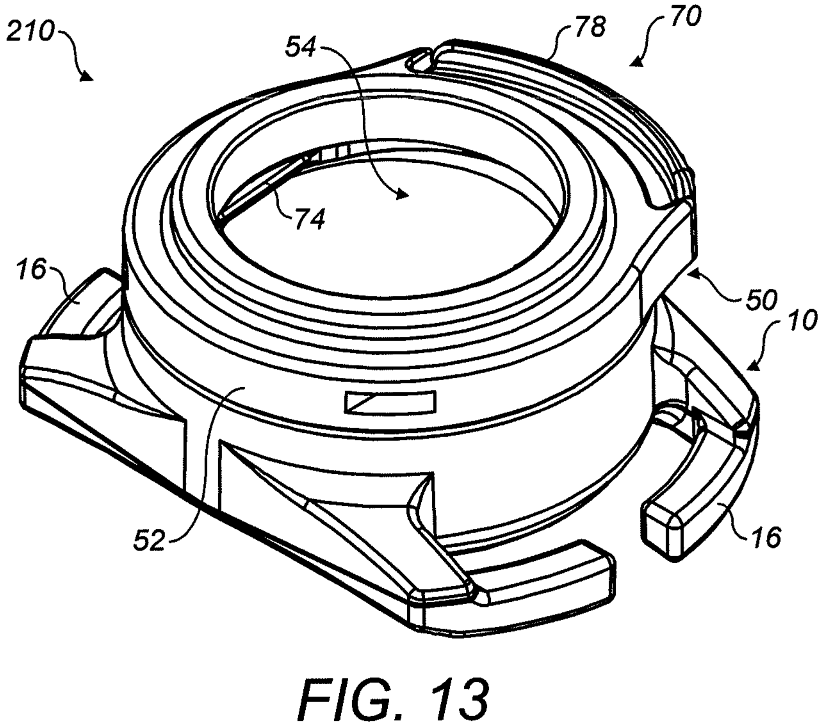
FIG. 13 schematically shows a perspective view of the assembly of FIG. 12.

Referring now to FIGS. 11-13, in order to make the third type (PI) LDV holder 210, the universal part 10 and the PI adapter 50 are threadedly engaged using the external thread 56 of the adapter 50 and the internal thread 18 of the universal base 10. The universal part 10 and the PI adapter 50 are threadedly engaged in a similar manner to that described above for the universal part 10 and the Rd40/ESA adapter 30 so that the locking protrusions 60 are located within the locking openings 22. This creates a "snap-fit" so that once the universal part 10 and PI adapter 50 have been screwed together, they cannot be unscrewed and disassembled. The PI spring 70 is attached to the PI adapter 50 by inserting the abutment portion 76 of the spring through the slot 64. The annular ring 72 is located within the groove 58 of the adapter and the locking tabs 74 project into the opening 54 of the adapter 50. The button resides within the vicinity of the slot 64 and the claws 80 inhibit the withdrawal of the spring 70 from the adapter 50.

In use, the third type holder 210 can be attached to a shoulder strap of a harness for breathing apparatus by using the strap-connecting portions 16 of the universal part 10. When a proprietary push-fit LDV (having a push-in connector) is not being used, it can be temporarily held by the holder by pushing it into the opening 54 of the PI holder 210. The retaining tabs 74 of the PI spring 70 locate within a circumferential groove of the push-fit LDV connector, thereby retaining the LDV. When it is necessary to remove the LDV from the holder 210, the button 78 is pushed inwardly. This causes the resilient ring 72 to deform into an oval shape and the retaining tabs 74 disengage from the circumferential groove of the LDV, thus allowing it to be removed.

The universal part 10, the Rd40/ESA adapter 30, the PI adapter 50 and the PI spring 70 are all made from plastic using injection moulding. This allows the parts to be made quickly and cheaply.

The various parts can be assembled to produce LDV holders 10, 110, 210 for different LDVs. Using a number of common parts to manufacture different holders reduces the cost of the holders. The locking feature between the universal part 10 and the adapters 30, 50 ensures that once the holders have been assembled they cannot be disassembled again. Further, the means of fixing the parts together using locking protrusions and locking openings requires no adhesive or additional fixing components such as screws or nuts and bolts. This results in an inexpensive and quick method of fixing.

Figure 14A:
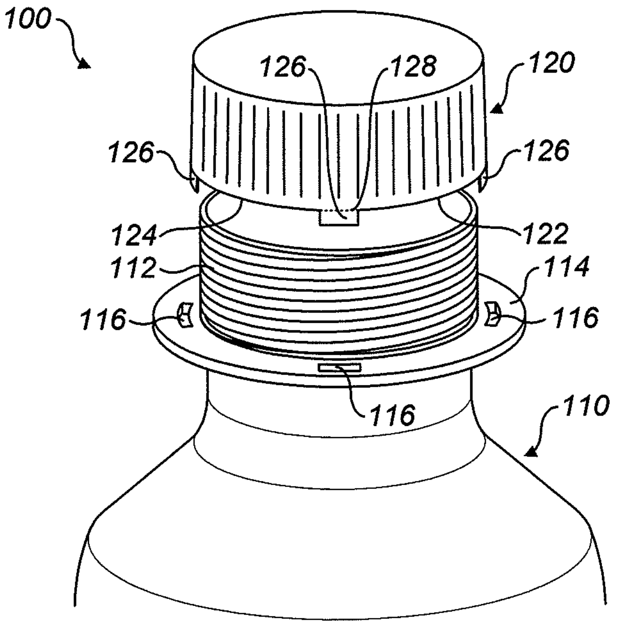
FIGS. 14*a* and 14*b* schematically show a second embodiment of the present invention in the form of a bottle and a screw-cap.
Figure 14B:
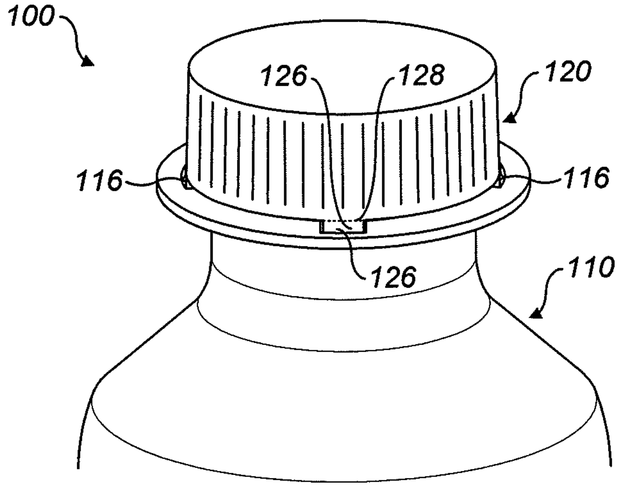

FIGS. 14*a* and 14*b* show a second embodiment of the present invention in the form of a two-part device 100 comprising a bottle 110 and a cap 120. The bottle 110 is provided with a threaded section 112, which is an external thread, and the cap 120 is provided with a threaded section 122 (not visible), which is an internal thread. The bottle 110 comprises an annular flange 114 having four locking openings 116 that extend in the general axial direction of the threaded section 112. The cap 120 comprises four locking projections 126 that extend from the rim 124 of the cap in the general axial direction of the threaded section 122. As the cap 120 is screwed onto the bottle 110, by means of the threaded sections 112, 122, the cap and bottle 110, 120 are drawn closer together and after a threshold number of turns the locking projections 126 locate within the locking openings 116. This inhibits the cap 120 from being rotated with respect to bottle 110 and therefore prevents the cap from being unscrewed.

The annular flange 114 of the bottle 110 may be resiliently deformable so that it can be flexed downwards, thereby disengaging the locking projections 126 and locking openings 116 and allowing the cap 120 to be unscrewed from the bottle 110.

Further, the locking projections 126 may be perforated along a line 128. When the locking projections 126 have been located in the openings 116, the cap 120 can be unscrewed by applying a sufficiently high torque to the cap 120. This results in the locking projections 126 being broken off along the perforation line 128 and allows the cap 120 to be fully unscrewed. This would act as a type of tamper-seal or childproof seal.

Figure 15A:
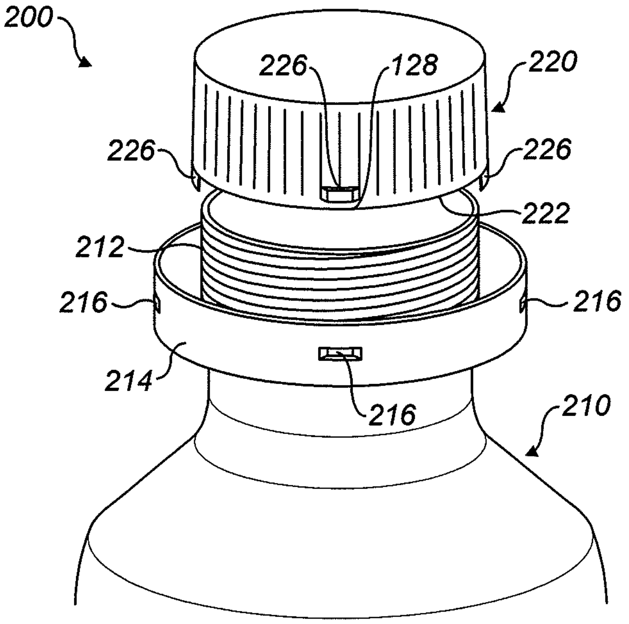
FIGS. 15*a* and 15*b* schematically show a third embodiment of the present invention in the form of a bottle and a screw-cap.
Figure 15B:
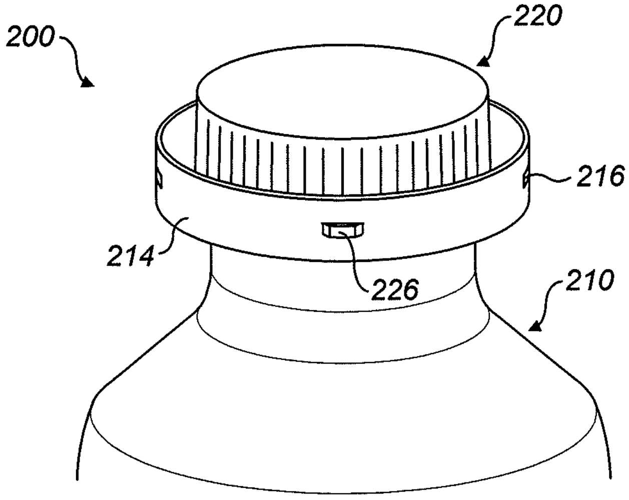

FIGS. 15*a* and 15*b* show a third embodiment of the present invention in the form of a two-part device 200 comprising a bottle 210 and a cap 220. This embodiment is similar to the second embodiment except the locking openings 216 are located in a collar 214 and extend in a direction substantially perpendicular to the general axial direction of the threaded section 212. The locking projections 226 are located on an outer surface of the cap 220 and extend in a direction substantially perpendicular to the general axial direction of the threaded section 222. When the cap 220 is threaded onto the bottle 210, by means of the threaded sections 212, 222, the cap and bottle 210, 220 are drawn closer together and after a threshold number of turns the locking projections 226 locate within the locking openings 216. This inhibits the cap 220 from being rotated with respect to bottle 210 and therefore prevents the cap from being unscrewed.

The invention claimed is:

1. A holder for a lung demand valve, the holder comprising:

a first part having a first threaded section provided on an external generally cylindrical surface;

a second part having a second threaded section arranged for threaded engagement with the first threaded section and provided on an internal generally cylindrical surface;

wherein one of the parts comprises at least one attachment portion for attaching the holder to a harness for breathing apparatus, and wherein the other part comprises a holding portion that allows a lung demand valve to be attached to the holder; and a locking opening provided on the first or second part and a corresponding locking protrusion provided on the other of the first or second part;

wherein the first and second parts are threadedly engaged by means of the first and second threaded sections with the locking protrusion located in the locking opening, thereby preventing the first and second parts from being threadedly disengaged;

wherein, during assembly, the first and second parts are threaded together by means of the first and second threaded sections, the locking opening and locking protrusion are drawn closer together and upon reaching a threshold the locking protrusion engages with the locking opening, thereby preventing the first and second parts from being threadedly disengaged;

wherein the holding portion comprises holding means for engaging with a lung demand valve.

2. A holder for a lung demand valve according to claim 1, wherein there are a plurality of locking openings.

3. A holder for a lung demand valve according to claim 2, wherein there are four locking openings.

4. A holder for a lung demand valve according to claim 1, wherein there are a plurality of locking protrusions.

5. A holder for a lung demand valve according to claim 4, wherein there are four locking protrusions.

6. A holder for a lung demand valve according to claim 1, wherein the number of locking openings is the same as the number of locking protrusions.

7. A holder for a lung demand valve according to claim 1, wherein the or each locking protrusion and the or each locking opening extends in the general axial direction of the cylindrical surfaces of the first and second threaded sections.

8. A holder for a lung demand valve according to claim 7, wherein the first threaded section is provided on an external generally cylindrical surface of a cylindrical portion and the or each locking protrusion is located on an annular end face of the cylindrical portion.

9. A holder for a lung demand valve according to claim 7, wherein the second part comprises a base portion located within the internal generally cylindrical surface, the base portion having an internal surface that is in a plane substantially perpendicular to the axis of the cylindrical surface.

10. A holder for a lung demand valve according to claim 9, wherein the second part comprises a base located within the generally cylindrical surface, the base having an upper surface in a plane substantially perpendicular to the axis of the cylindrical surfaces and wherein the or each locking opening is provided in the base.

11. A holder for a lung demand valve according to claim 10, wherein the base is resiliently deformable.

12. A holder for a lung demand valve according to claim 10, wherein the base has a central opening.

13. A holder for a lung demand valve according to claim 1, wherein the or each locking protrusion is resiliently deformable.

14. A holder for a lung demand valve according to claim 1, wherein the first part and or the second part are made from a plastics material.

15. A holder for a lung demand valve according to claim 1, wherein the holding means for engaging the lung demand valve is selected from the group consisting of: an internal thread formed in accordance with either EN 148-1 (Rd40×1/7) and/or EN 148-3 (M45×3); a circumferential locking lip corresponding to a connector of a lung demand valve formed in accordance with DIN 58600 (ESA); and locking tabs arranged to engage a circumferential groove provided on a lung demand valve.

16. A holder for a lung demand valve according to claim 1, wherein the first and second threaded sections are formed in accordance with either EN 148-1 (Rd40×1/7) or EN 148-3 (M45×3).

17. A harness for breathing apparatus comprising a holder for a lung demand valve according to claim 1.

* * * * *